Figure 1:
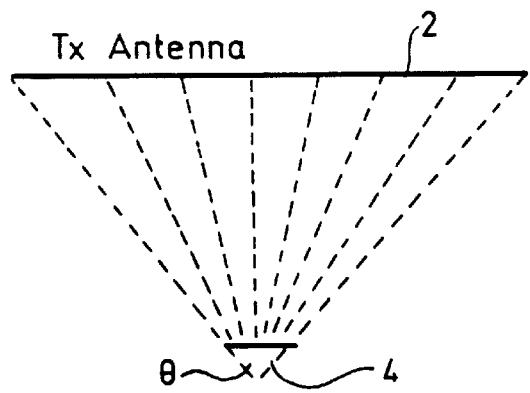

United States Patent [19]
Benjamin

[11] Patent Number: 5,969,661
[45] Date of Patent: Oct. 19, 1999

[54] APPARATUS FOR AND METHOD OF DETECTING A REFLECTOR WITHIN A MEDIUM

[75] Inventor: Ralph Benjamin, Bristol, United Kingdom

[73] Assignee: University of Bristol, Bristol, United Kingdom

[21] Appl. No.: 08/867,899

[22] Filed: Jun. 3, 1997

[30] Foreign Application Priority Data

Jun. 6, 1996 [GB] United Kingdom ............... 9611801

[51] Int. Cl.⁶ .................................................. G01S 13/02
[52] U.S. Cl. ............................ 342/22; 367/138; 367/7
[58] Field of Search ................... 367/138, 7, 11; 342/22

[56] References Cited

U.S. PATENT DOCUMENTS 5,608,690  3/1997  Hossack et al. ................. 367/138

*Primary Examiner*—Daniel T. Pihulic
*Attorney, Agent, or Firm*—Baker & Botts, L.L.P.

[57] ABSTRACT

An apparatus is provided in which a phased transmitting array (21) is arranged to irradiate a selected voxel within a search volume. Energy reflected from the voxel is received by a further antenna and the signals received from a plurality of voxels are analysed to search for reflectors or discontinuities within the search space.

28 Claims, 2 Drawing Sheets

Mutually Reciprocal Antennas

Depth of Focus
F = focal plane at beam waist
$R_d$ = Rayleigh distance

APPARATUS FOR AND METHOD OF DETECTING A REFLECTOR WITHIN A MEDIUM

The present invention relates to an apparatus for, and method of, detecting a reflector within a medium. The reflector may, for example, be an object such as a line, and the medium way be the ground. Alternatively, the present invention may be used to detect the presence of a tumour within a human or animal body. As a further alternative, the invention may be used to inspect materials in a quality assurance test.

The most promising technique to date for detecting buried mines, ultra-wide-band ground penetrating radar is still quite limited as regards:

depth of penetration of attenuating ground false alarm rate missed detections need for skilled operation and interpretation area covered per unit time.

Known ground penetrating radar systems emit an energy pulse which propagates from the radar transmitter, and has a substantially hemispherical wavefront. Reflecting objects within the ground reflect the wavefront and the round trip propagation time from the radar, to the reflector and back to the radar is measured and displayed. The travel time to a reflector laterally offset from the radar in longer than the travel time to the reflector when it is directly below the radar. In use, the radar is physically moved over the ground surface in an attempt to find the position, or in the case of an elongate object positions, of minimum travel time. The object is then located directly beneath these positions.

According to a first aspect of the present invention, there is provided an apparatus for detecting a reflector within a medium, comprising at least one transmission means for sequentially focusing energy towards a selected one of a plurality of volume of the medium, and reception s for receiving energy reflected from the selected volume of the medium.

The reflector may be an object located within the medium, a discontinuity within the medium or an inhomogeneous region within the medium. Each volume forms a resolution call within the medium.

It is thus possible to provide an apparatus in which the reflectivity of a plurality of cells within a search volume are investigated, and the reflected radiation is analyzed in order to determine whether one or more of the cells contains a reflector.

Preferably, the search volume is adjacent or sufficiently near to the apparatus such that the focused energy effectively exhibits a "depth of focus". Thus, regions of space outside of the depth of focus are not coherently irradiated.

The energy may be in the form of electro-magnetic radiation. Radio frequency radiation falling within the microwave or millimetric regions of the electro-magnetic spectrum are preferred radiations. Alternatively acoustic wave, such as ultra-sound, may be used.

Preferably, the focusing is provided by electronic means.

Preferably the at least one transmission means comprises at least one multi-element antenna in which the phase of signals transmitted from the antenna elements can be adjusted in order to provide a phase array antenna. Advantageously the phased array extends in two dimensions such that the focal point of the energy can be controlled in the dimensions. The phased array antenna is controlled so as to focus the energy emitted therefrom into a volume in the near field region of the antenna.

The terms "near field" and "far field" are understood by the person skilled in the art. However, by way of explanation, known phased array antennas used in radar systems of the type used to detect aircraft perform beam steering and consistently are intended to produce a beam having a substantially planar wave front. The plane wave front eventually diverges at an angle which decreases with increasing size of the initial plane aperture. The orientation of this planar wave front steers it in two dimensions (e.g. azimuth and elevation) and its planar nature focuses it to infinity. Any convex curved wavefront would generate a more widely diverging beam, and a concave wavefront would converge onto a focal point and diverge from there onwards. This initial convergence onto a "near-field" focal point is exploited in the present invention. Quite generally, the near field describes the region near the antenna where the wavefront shape is relatively complex and is still evolving towards the narrow divergent beam that is observed in the far field.

The signals from each of the antenna elements of the multi-element (phased array) antenna are, by definition, in phase at the focal point and substantially in phase within a radius of $\frac{1}{2}D_1$ where D is the spot diameter. The spot diameter $D_1$ in given by:

$$D_1 = \lambda/\theta$$

where $\theta$ in the convergence angle and $\lambda$ is wavelength

The reception mans may be a simple antenna, but preferably the reception is a multi-element antenna where phase delays can be inserted into the signals received by each of the antenna elements so as to provide a phased array reception antenna. The reception antenna is, in use, focused onto the same volume as the or each associated transmit antenna. The transmit and receive antennas may be provided by operating a single physical antenna array in a time multiplexed manner. This mode of operation is referred to as monostatic operation.

As an alternative, separate transmit and receive antennas may be provided. This is referred to as bistatic operation. Although the transmit and receive antennas are focused on the same volume, the propagation paths between the volume and the respective antenna are different. Thus scatter and clutter from objects outside of the focal call is greatly reduced.

Preferably the frequency of the electro-magnetic radiation or acoustic wave is adjustable so as to set the wavelength thereof in the medium to a predetermined wavelength. The speed of propagation of electromagnetic or acoustic radiation depends on the physical nature of the propagating medium. Since the resolution achieved is a function of the wavelength in the medium, the use of a variable frequency electromagnetic wave or acoustic wave source allows the resolution to be controlled. In, for example, a ground penetrating radar system constituting an embodiment of the present invention, the wavelength of the microwaves in moist soil is between ⅓ and ⅛ of the free space wavelength. It the frequency of operation is kept constant, these changes in wavelength would affect the attenuation in the course of ground penetration and the focusing resolution of the apparatus. By controlling the frequency of operation, it is possible to maintain the wavelength in the medium at a substantially constant value, thus maintaining a substantially constant resolution and minimising changes in attenuation. The characteristics of the medium (i.e. attenuation and propagation speed) may, for example, be determined by transmitting signals of at least one frequency (and normally two or more frequencies) between two sensor probes in contact with the medium and measuring the phase shift (or changes thereof) and/or amplitude change between the transmitted and received signals, or by performing back scattering measurements.

Preferably impedance matching means in provided intermediate the or each antenna and the medium. In embodiments employing electro-magnetic radiation as an interrogating signal, the or each antenna may be faced with a compliant covering matching the observed of the medium, such as the ground characteristics.

The electrical matching of the antenna elements with the medium substantially prevents energy being reflected back to the transmitter. The sheet may be in contact with the medium thereby providing effective continuity of the bulk impedance between the antenna and the medium. Alternatively, the index matching shoot may be spaced from the medium such that reflections from the sheet (for example, from the face nearest the medium) and from the surface of the medium undergo destructive interference and substantially cancel one another.

Preferably the power profile across the transmitter array is varied so as to compensate for attenuation within the medium. In a lossy medium, the changes in path length from each individual element to the focal point will cause some elements to make a larger contribution to the focused signal than other elements. This can be visualised in the case of a one dimensional antenna array focusing on a volume beneath the mid point of the array. The antenna element at the centre of the array would contribute more of the signal received at the focal point than those antenna elements at the ends of the array. Thus the effective size of the antenna array is reduced. In order to prevent this effective reduction in antenna array size from occurring (thereby maintaining the benefit of the full aperture for focusing), the contributions of each element is normalised by attenuating the signals from the elements nearest to the focal point with respect to those more distant elements such that each element contributes equally or nearly equally to the signal at the focal point.

Preferably the or each antenna array is moveable vertically and can be tilted so as to follow the contours of a surface of the medium. Advantageously sensors are provided to measure the displacement of the antenna array such that the position of each element in the array can be calculated and corrections to the phase shifts introduced so as to refocus the array onto the selected volume within the search space.

Advantageously two transmit antenna arrays operating at similar but different frequencies are focused simultaneously at a predetermined volume and a receive antenna is operational to receive signals returned from the volume. The transmitted signals can be high power short duration pulses. The convergence of the signals can excite dielectric non-linearities within material located within the volume thereby causing a beat (ie. sum or difference) signal to be generated within the volume. This beat frequency can then be detected by the receive antenna.

The transmit and receive antennas may be mounted on a boom for use in a mine detection system. The boom may be mounted on a vehicle.

The system can also be used for medical diagnosis. Growths or tumours frequently have a different metabolism to the surrounding tissue and frequently have a different impedance thereto. Thus the growths or tumours will reflect microwaves or ultra-sound and consequently can be located using this technique.

According to a second aspect of the present invention, there is provided a method of detecting a reflector within a medium, comprising the steps of:

(1) defining a search space within a medium, the search space comprising a plurality of cells;
(2) focusing energy into a selected cell;
(3) receiving energy reflected from the cell: and
Repeating steps 2 and 3 for each of the cells.

The energy reflected from each cell enables a representation of the reflectivity of each cell within the volume to be determined. Strongly reflected signals are an indication of a discontinuity, inhomogeneity or object located within the medium.

Figure 2:
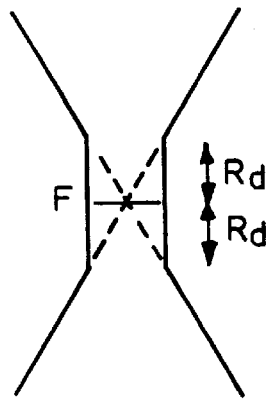
Figure 3:
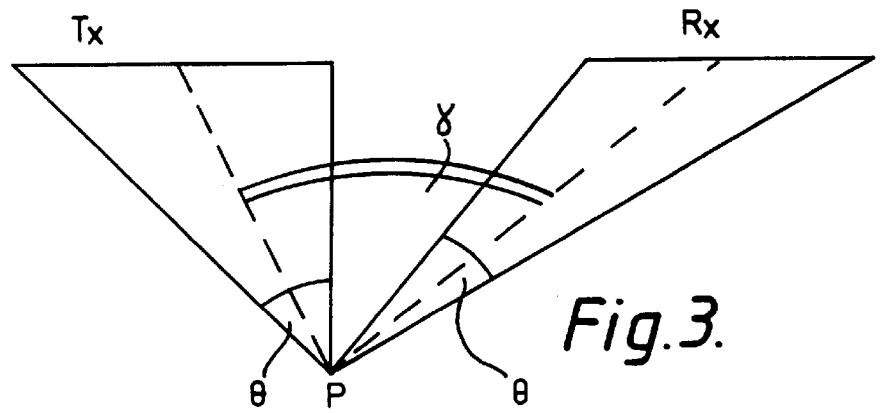
Figure 4:
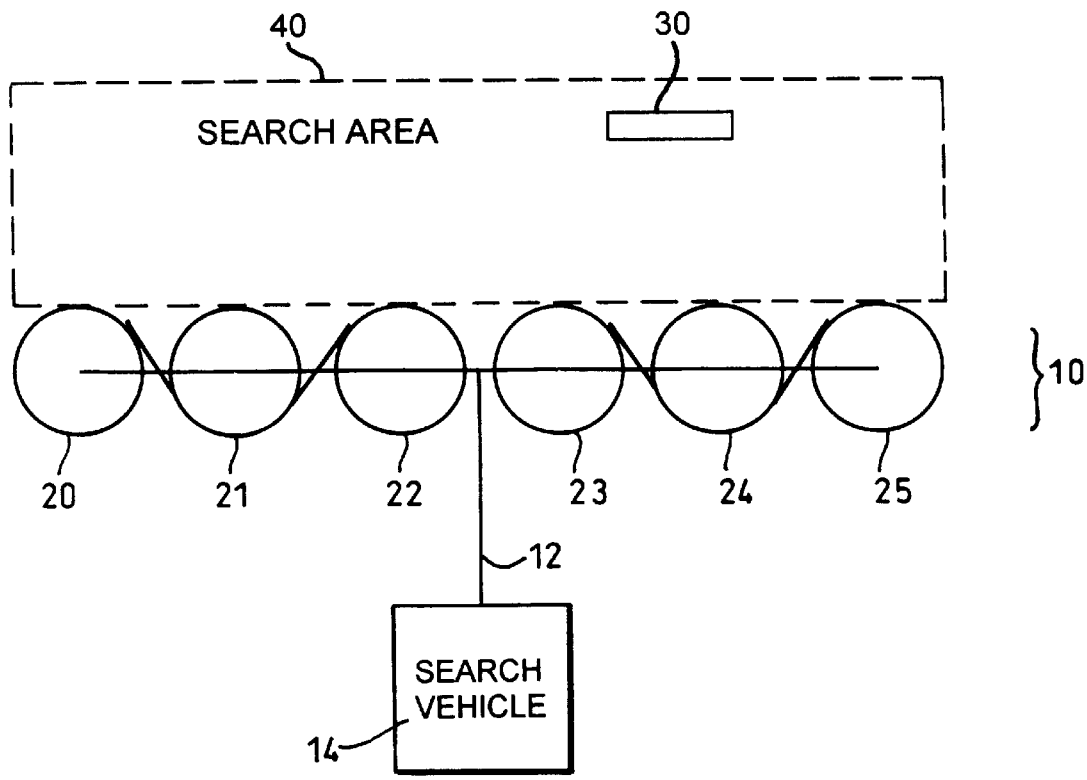
Figure 5:
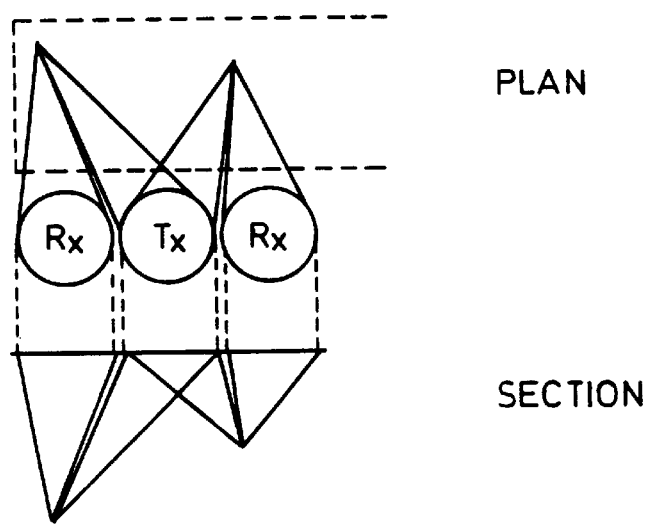

The present invention will further be described, by way of example, with reference to the accompanying drawings, in which, FIG. 1 is a schematic diagram illustrating (in two dimensions) the search focusing action;

FIG. 2 is a schematic diagram illustrating the depth of focus;

FIG. 3 schematically illustrates a bistatic system having separate transmit and receive antennas and constituting an embodiment of the present invention;

FIG. 4 is a schematic illustration of a mine detection sensor head constituting an embodiment of the present invention; and FIG. 5 schematically illustrates a search pattern for the arrangement shown in FIG. 4

The use of near-field focused radar enables individual resolution calls, known as voxels, within a three dimensional search space to be examined. The signals to all elements of the transmitting array are set to whatever amplitude, phase and delay may be required for each element such that the contributions of all the elements arrive at the same time, with equal amplitude and phase, in the selected voxel and in no other voxel. Thus, the transmissions combine coherently in the selected cell, producing a three dimensional focal spot of irradiation. Similarly, the signals from the elements of the receiving array are subjected to whatever amplitude, phase and delay may be required, so that reflected signals from the selected irradiated voxel will be summed, at the same time, with equal amplitude and phase. Thus, they—and only they—combine coherently within the receiver. Spot-focusing of the transmitted and received radiation enhances the resolution. The focusing convergence gain that is achieved by using focused transmit and receive antennas counteracts the path-loss in a highly attenuating medium, such as moist soil. Furthermore, unwanted reflecting objects are unfocused, thus substantially reducing obscuration of wanted targets by "clutter". This is of special importance in an attenuating medium, where a shorter unwanted path would benefit from reduced path loss. These gains in sensitivity also enable the extra attenuation of operation at a short wavelength (attenuation increasing with frequency) to be tolerated, thus improving the compromise between resolution and depth of penetration.

Antenna reciprocity states that the coupling between two antennas is independent of which is transmitting and which receiving. When an antenna 2 is focused onto a point in near field then, by the definition of focusing, that point is coherently irradiated. The resulting focal spot 4 can then be regarded as a receiving antenna. By at reciprocity, its diameter is therefore equal to that antenna aperture whose beam width would just encompass the source antenna as shown in FIG. 1. Thus the focal spot diameter is $D_1=\lambda/\theta$, where $\theta$ is the convergence angle and $\lambda$ the wavelength. Beyond $\pm D_1/2$, the received phase will no longer support coherent integration of the signal singing on the focal point. For mono-static coherent reception, we are concerned with the signal returned from the focal spot back to the transmitting antenna. Thus the range of phase changes experienced in the two-way path from and to the antenna is doubled, and so the relevant coherence-length is halved to $D_2=\lambda/2\theta$. In a bistatic configuration, the sensitivity of the phase, observed from the two-way path, to lateral displacement depends on $\gamma$, the angle between the transmitted and received rays, and so $D_3=\lambda/2\gamma$.

FIG. 3 schematically illustrates an arrangement in which a transmitting antenna Tx and a receive antenna Rx are focused at a common focal point P. The convergance angles of the respective focused beams are indicated by $\theta$ and the displacement between the mid points of the antenna arrays is indicated by the angle $\gamma$.

Since objects are to be resolved in 3D, the depth of focus is also an important parameter. By the Rayleigh principle, an antenna does not form a beam of angular width $\theta$ originating from its centre, but an essentially parallel beam, of diameter equal to its aperture D, up to the Rayleigh distance where the "ideal" divergent beam would have spread out to width D. Hence the Rayleigh distance is $$R_d = D/2 \cot \theta/2 \qquad (1)$$

However, the radiation converges towards the focal spot and then diverges again, thus maintaining a near-constant width D within length $\pm R_d$, as shown in FIG. 2. Hence the depth F of focus is $$F = D \cot \theta/2 = \lambda/2\theta \cot \theta/2 \qquad (2)$$

The approximation $\cot\theta \approx 100/\theta$ is accurate within $\pm 10\%$ for $90° \geq \theta \geq 5°$, where $\theta$ is measured in degrees. In a ground penetrating radar constituting an embodiment of the present invention, the near-field focusing convergence angles are fairly large—between 40° and 120°—and so $D \approx \lambda$, and $\lambda \leq F \leq 3\lambda$. Here $\lambda$ is the wavelength in the propagation medium. For moist soil $\lambda$ is between ⅓ and ⅛ of the free-space wavelength. Inhomogeneities in the ground will perturb the equi-phase condition at the focal spot, and so they reduce—indeed they can ultimately destroy—the focusing gain. Hence $\lambda$ must be kept sufficiently large, compared to the scale of such inhomogeneities, to maintain the focusing gain even at the expense of reduced resolution.

Detection may ultimately be limited by nearby clutter. With conventional far-field focused array antennas the directional pattern of a single antenna element is much wider than the collimated beam, due to the coherent combination of all of these single-element radiations. Hence, the focused beam in flanked by a pattern of side lobes due to the non-coherent combination of these element patterns. Thus, the wanted target has to complete with the non-coherent aggregation of clutter from this wider area. Conversely, the target object will of course also make a clutter-like contribution to all other objects within this wider area. This is equally true in this scheme, but in this case, the viewing directions differ significantly from element to element, and so clutter arcs seen by these elements do not coincide except close to the focal cell, thus further reducing any coherence between these clutter contributions.

There is, however, a second, similar process, because focussing in performed in the range dimension as well as in two-dimensional angular space. Practical pulse lengths will be substantially longer than the dimensions of the focal cell. Hence, in the range dimension too, the focal cell is flanked by a pattern of side lobes due to the non-coherent combination of the element pulses. Due to the combined effect of these two phenomena, the focal cell is surrounded in all three dimensions by side lobes, with some resultant impairment of the signal/clutter ratio and some blurring of resolution.

Design options are severely affected the constraints imposed by the medium, and these are considered below:

The propagation speed—and hence the wavelength—in soil in typically 3 to 8 times smaller than in free space. Hence any phased-array at would have to be in effective contact with, and matched to, the propagation medium. But the size of the antenna elements and their spacing define the wavelength with a tolerance of, at most, about ±20%. To overcome this the operation frequency is variable to cover the appropriate range of soil conditions, thus maintaining a substantially constant wavelength within the soil and hence constant resolution. Since the path loss per wavelength tends to be fairly constant, with changing soil conditions, this also results in a near-constant performance. Frequency selection does, however, have to be accompanied by the appropriate electrical impedance matching in the phased array.

Effective continuity between the medium and the antenna arrays, can be achieved by facing the antennae arrays with the appropriate one of range of compliant sheets matched to the locally pertaining soil impedance. Depending on the operating conditions, this sheet may be in physical contact with the ground or separated from it by one wavelength in air (or an integral number of wavelengths), so that the reflections from the two interfaces cancel.

In a lossy medium, ray-to-ray variations in path-length can seriously distort the pattern of relative powers of the rays converging from different directions onto the near-field focal spot. For maximum focusing gain and resolution, it is desirable to use the largest practical antenna array. Its useful size is however restricted by the fact that the elements furthest from the near-field focal spot have a substantially longer path length—and hence experience substantially more attenuation—than the elements nearest the focal spot, and so the potential contribution of the more distant elements in limited. To obtain the true resolution benefit of using the full aperture for focusing, it is necessary to normalise gains by attenuating the signals transmitted from the nearer elements of the array, to equalise their lower path-losses. There is a maximum antenna diameter (roughly 5 times the electrical "skin depth" of the radium, at the given frequency) beyond which the extra aperture gain is more than counterbalanced by the extra normalising loss. In mine-search, safety considerations may require the antenna to be laterally offset from the vertical through the search-point. This increases the path lengths and losses, but mitigates slightly the problem of differential path losses.

If the ground 40 is overgrown, the sensor 10, on a boom 12 ahead of the search vehicle 14, may have to be preceded by a non-ferrous cutting and clearance tool on a further forward extension of the sensor boom. Since the ground 40 will normally be rough, good contact may require the front-face of the antenna to be faced with a soft mat of the appropriate index-matching material, as already indicated. For such contact, it is necessary to place the antenna onto the ground 40 and take a series of measurements, and then lift the antenna and move it to the next, adjacent ground 40 position. The ground is also likely to be uneven on a larger scale. As shown in FIG. 4, a T-shaped boom 12 projects forward from the operating vehicle, far enough to ensure the safety of the vehicle in an accidental mine explosion. Six (but other numbers can be selected) disc arrays 20–25 (with padded faces) are mounted at a front-end crosspiece of this boon. Each or these discs can adapt to the gross variations of the ground 40, both vertically and by tilting about the roll and pitch axes, with sensors measuring these displacements, so that the excitation can be adapted accordingly.

With in-contact discs, an ultra-sonic acoustic version of the apparatus can also be implemented. This performs best in wet ground, the very conditions where a microwave system is most limited. The echoing delay times are then of course enormously larger than in the electro-magnetic variant. However, as shown below (for the electro-magnetic scheme), any in-contact scheme the search rate is limited entirely—and quite severely—by non-sensor considerations.

To cover a search volume of 2 m (width)×1.5 m (forwards)×0.6 m (depth), at 5 cm intervals in 3D, would involve the transmit and receive beams focusing sequentially onto 14,400 distinct resolution cells, voxels. Even for the slowest propagation speed (refractive index of 8), the maximum-range echoing time, the average search time is under 0.03 $\mu$s. Even allowing a total of 0.7 $\mu$s per resolution cell, to make generous provision for beam forming and for any "chirp" pulse-spreading, the 14,400 spot searches only take a total of 0.01 s. Thus the search time 15 governed virtually exclusively by mechanical processes. For instance, a cyclic search scheme may be as follows:

| | |
|---|---|
| 1. fit discs to ground | 3 s |
| 2. sequential beam forming and search | — |
| 3. advance boom by 1.5 m (vehicle remaining stationary) | 6 s |
| 4. repeat 1–3 | 9 s |
| 5. repeat 1–3 | 9 s |
| 6. repeat 1–2 | 3 s |
| 7. advance vehicle 6 m, whilst retracting boom by 4.5 m | 15 s |
| TOTAL DURATION | 45 s |

Subsequent cycles would repeat steps 1–7, above. This scheme is designed to minimise the time taken by the mechanical processes, which dominate the search rate. These arbitrary but not unrealistic figures give a total of 45 s for searching 2 m (width)×6 m (advance)×0.6 m (depth),— ie. an average advance of 1 m every 7.5 seconds.

The same equipment can also operate in a non-contact whenever the ground conditions are suitable, thus permitting a far higher search rate to be achieved. For non-contact search, the electronic scan can be limited to a single resolution cell plane normal to the direction of vehicle travel, the third dimension being provided by the vehicle's own advance. In some circumstances it might however be expedient to search over one mine diameter in the forward direction. In either case, there would clearly be no significant electronic limit to the search rate. The limit is set by the requirement, on detection of a mine to stop before reaching the mine, say, within 5 m at a retardation of 0.25 G. This would correspond to a forward speed of 5 m/s=18 km/hr. Any higher speed would require a further boom extension and/or a higher braking rate.

It will be observed that, in a non-contact mode of operation, refraction may occur at the air-medium interface.

The convergence angle in air is typically limited to ±60°. Hence, by Snells law the convergence angle in the medium (ie ground) will be approximately ±60°√$\epsilon$, where $\epsilon$ is the relative permittivity of the medium. This gives rise to a lateral resolution D of:

$$D=\lambda\sqrt{\epsilon}/2$$

Since the normal range of the relative permittivity is between 4 and 30, the convergence angle varies between ±30° and ±11°. The corresponding $\lambda\epsilon$/2 (ie the "beam waist" which is twice the Rayleigh distance of $D^2/\lambda$) and will vary between 2$\lambda$ and 15$\lambda$. However, in practice the range resolution will have an upper limited of 5$\lambda$ for a 20% bandwidth.

In order to obtain a constant lateral resolution independant of $\epsilon$, one need merely keep the operating frequency constant (since at a given frequency $\lambda\propto\epsilon^{-1/8}$, thereby compensating for the reduced convergence angle). However, this would result in both $\lambda$ and the attenuation per unit distance varying as a function of $\epsilon$.

In air (ie non-contact) operation can also give rise to inefficient coupling to the ground. This also gives rise to significant reflection at the air-ground interface which could interfere significantly with the reception of the system. In order to overcome this, a large antenna-to-ground spacing could be used thereby giving rise to brief well defined ground reflections separated by longer interference free intervals. Alternatively an absorbent layer in front of the antenna could largely eliminate all reflections subsequent to the first reflection of any actuation. This would however attenuate the wanted signals in the 'go' and 'return' directions.

As a further alternative the antenna may be added in or positioned adjacent a matching sheet to cancel reflections from the air/medium and the medium/air interfaces. This cancellation is subject to certain limitations. There is no cancellation for an interval equal to the two-way reflection time at the beginning of the pulse and again at the end of the pulse. However, these reflections can be disregarded or eliminated in the time domain. However reverberation of these signals between the antenna and the ground could affect operation of the system. An increased antenna to the ground spacing could worsen the problem. Thus having generated a ±60° curved convergent wavefront from a set of concentric rings of elements, it is possible to achieve substantially full concellation in one of the rings of elements. However, in addition, for an active patch within the array it is also possible to achieve substantial cancellation in the summation of reflections in all elements involved.

As mentioned before, a problem arises in that the wavelength in the medium varies as a function of $\epsilon$. The array elements should be matched in size to the smallest $\lambda$ used. For longer wavelengths several elements could be treated as one longer composite element.

The very close ranges involved in mine-search pose considerable duplexing problems, when using the same antenna for transmission and reception. These problems are avoided by bistatic operation, with distinct transmit and receive antennas. In each of the two triplets of discs shown in FIG. 4, the centre discs 21 and 24 are the transmitting (Tx) arrays and the outer ones 20, 22, 23, 25 (used one at a time) the receiving (Rx) arrays (other configurations could be used). As already mentioned, such a bistatic configuration also enhances the resolution of the constituent antennas, by benefiting from the combined convergence angle between the two antennas. Bistatic operation entails some increase in path lengths, and hence in losses, but the propagation loss due to the combined go and return paths varies much less drastically with focal-cell location than in a monostatic configuration. This reduces the system's dynamic range, and it reduces the risk of reflections from nearer scatterers impairing detection of more distant ones. Most important of all, the beams from the two antennas (or at least their main lobes) coincide only at the selected focal cell. Hence any reflecting object 30, outside the common focal cell of the transmit and receive antennas, cannot be in the main beams of both antennas, even in an unfocused state. This largely eliminates obscuration of the wanted target by "clutter". Exemplary beam directions are shown in plan view and in section in FIG. 5.

For optimum resolution, the operating frequency is chosen so that echoes from the maximum required depth of penetration will just be detectable against the background of clutter and/or thermal noise. This involves an attenuation of many tens of dB in both the 'go' and 'return' paths. However, in an alternative operating mode, both antenna of the bistatic scheme may transmit, at frequencies differing by a small predetermined offset (say 10% of the carrier frequency). The transmission comprises very short pulses of high peak power, but with a low "duty cycle", to maintain the same mean power. (The risk of radiation setting off a mine detonator is primarily a function of mean power). The two short, high-power pulses, converging on the focal spot at the same instant, excite a dielectric non-linearity of the substance at that focal spot, thus making it operate as a heterodyne mixer, producing a signal at the given low difference frequency. This difference-frequency signal is returned, with negligible loss, to a separate antenna and receiver on the surface. (Crossed dipoles can be used to cope with the uncertain polarisation). If one or more harmonics of the difference frequency are also received, the relative power of these components may also be of diagnostic value, for classifying the object irradiated.

This heterodyne operation, with negligible return-path loss, may permit a significant increase in the depth of penetration, at a given wavelength, even after allowing for the low efficiency of the conversion from the incident radiations into this difference-frequency signal. In addition, this mechanism gives a virtual guarantee that the received signal can only come from the focal spot where:

(1) both incident signals arise at the same point,
(2) and at the same instant in time,
(3) and at a high power level, localised in time (by pulsing) and in space (by focusing).

Such heterodyne detection of a mine will of course depend on the existence of a noticable dielectric non-linearity, and on this dielectric non-linearity being different from (probably higher than) that of the surrounding medium. It is thought likely that the non-linearity manifests itself as the molecular dipoles attempt to align themselves to the incident electromagnetic field. Since the long-chain molecules of a plastic mine-casing or indeed of the mine filling have a much larger electric dipole moment than the surrounding earth, if the non-linearity in the mine are present at all, the prospect of a significant differential non-linearity seem good.

The use of short pulses, essential for heterodyne operation, is also desirable, for resolution, for clutter elimination (which however depends primarily on the bistatic geometry and the bistatic heterodyne operation), and because pulse lengths shorter than the time-constant of resonant absorption mechanisms can reduce absorption losses. (In this respect ultra-short pulse radars can gain an even bigger benefit).

The amplitudes and phases of the return signals received in the individual receiver antenna elements may be processed in analogue circuits and/or recorded and processed digitally for focusing. The resultant signals representing the discrete returns from all the resolvable resolution cells are then analyzed, primarily in respect of their amplitudes, and the data processed by a suitable data processor, such as a programmable computer, to indicate the likely probability of existence, and position, of a mine or other objects in the ground for display and/or for initiating an appropriate automatic procedure.

As noted hereinbefore, similar techniques can be used in sensing other media and other resolution scales, including medical diagnostic equipment to perform non-invasive investigation of a body.

It is thus possible to provide a near field focused investigative system for detecting objects within a medium with good depth of penetration, good three dimensional resolution and a relatively high search rate.

I claim:

1. An apparatus for detecting a reflector within a medium, comprising at least one transmission device for sequentially focusing energy towards a selected one of a plurality of volumes of the medium, and a reception device for receiving energy reflected from the selected volume of the medium, and having an adjustable frequency of the energy so as to set the wavelength thereof in the medium to a predetermined wavelength.

2. An apparatus as claimed in claim 1, in which the plurality of volumes form a search volume, and in which the search volume is adjacent or sufficiently near the apparatus such that the focused energy exhibits a depth of focus.

3. An apparatus as claimed in claim 1, in which the selected volume is coherently irradiated.

4. An apparatus as claimed in claim 1, in which regions of space outside of the selected volume are not coherently irradiated.

5. An apparatus as claimed in claim 1, in which the energy is selected from one of electromagnetic radiation and acoustic radiation.

6. An apparatus as claimed in claim 5, in which the electromagnetic radiation is selected from one of microwave and millimeter wave radiation.

7. An apparatus as claimed in any one of the preceding claims, in which the energy is focused at the selected volume by electronic means.

8. An apparatus as claimed in claim 1 in which the at least one transmission device comprises at least one multi-element antenna in which the phase and timing of signals transmitted from the antenna elements is adjusted in order to generate a coherent phase front, curved to converge onto a selected volume of the medium, wherein the power of transmit elements is adjustable such that those transmit elements further from the selected volume are supplied with more power than nearer elements, to compensate for attenuation in the medium.

9. An apparatus as claimed in claim 8 in which the multi element antenna extends in two dimensions such that a focal point of the energy is positioned in three dimensions.

10. An apparatus as claimed in claim 8 in which the multi-element antenna is controlled so as to focus the energy emitted therefrom into a volume of space in the near field region of the antenna.

11. An apparatus as claimed in claim 1, in which the reception device comprises an antenna.

12. An apparatus as claimed in claim 11, in which the antenna is a multi-element antenna, wherein phase and timing delays are inserted into the signals received from each of the antenna elements to provide a phased array reception antenna.

13. An apparatus as claimed in claim 1, comprising a single antenna used both as a transmit antenna and a receive antenna.

14. An apparatus as claimed in claim 11, in which separate transmit and receive antenna are provided.

15. A apparatus as claimed in claim 1 wherein the wavelength is adjusted to maintain the resolution substantially constant.

16. An apparatus as claimed in claim 1, further comprising means for determining characteristics of the medium, said characteristics comprising at least one of permeability, permitivity, attenuation and propagation speed, are determined by back scatter measurement or by transmitting energy at at least one frequency between sensor probes and measuring changes between the transmitted and received signals, in order that the frequency of the transmitted energy is selected to set the wavelength to a predetermined wavelength.

17. An apparatus as claimed in claim 1, wherein the at least one transmission device comprises at least one multi-element antenna and further comprising an impedance matching means intermediate the at least one antenna and the medium, said impedance matching means being a compliant sheet in contact with the surface of the medium.

18. An apparatus as claimed in claim 17, in which the the sheet matches the observed characteristics of the medium.

19. An apparatus as claimed in claim 18, in which the sheet is compliant so as to permit operation in loose contact with a rough surface.

20. An apparatus as claimed in claim 18, in which the sheet is spaced from the surface of the medium and arranged such that reflections from the surface of the medium and reflections from a surface of the sheet undergo destructive interference.

21. An apparatus as claimed in claim 1 wherein the energy is selected from one of electromagnetic radiation and acoustic radiation.

22. An apparatus as claimed in claim 8, in which the at least one antenna is movable vertically and tiltable to follow the surface of the medium.

23. An apparatus as claimed in claim 22, further comprising sensors to measure the displacement of the at least one antenna such that the position of each element of the at least one antenna is calculated and corrections made to refocus the at least one antenna onto the selected volume.

24. An apparatus an claimed in claim 1, comprising first and second transmit antenna operating at different frequencies and focused simultaneously onto a selected volume, and a receive antenna to receive signals from the selected volume.

25. An apparatus as claimed in claim 24, in which the reception device is responsive to the beat frequency formed by the different frequencies.

26. An apparatus an claimed in claim 1, in which the or each antenna is mounted on a boom for use in a mine detection system.

27. A medical imaging device comprising an apparatus as claimed in claim 1.

28. A method of detecting a reflector within a medium, comprising the steps of:

i) defining a search space within a medium, the search space comprising a plurality of cells;

ii) adjusting the frequency of the energy to set the wavelength thereof to a predetermined wavelength;

iii) focusing energy into a selected cell;

iv) receiving energy reflected from the cell; and v) repeating steps ii, iii, and iv for each of the cells.

* * * * *